US012762946B2

(12) United States Patent
Stenneth et al.

(10) Patent No.: US 12,762,946 B2
(45) Date of Patent: Oct. 13, 2026

(54) SYSTEM AND METHOD FOR DETERMINING ROAD WORK ZONE START LOCATION

(71) Applicant: HERE Global B.V., Eindhoven (NL)

(72) Inventors: Leon Stenneth, Chicago, IL (US); Bruce Bernhardt, Wauconda, IL (US); Advait Mohan Raut, Virar West (IN); Jingwei Xu, Buffalo Grove, IL (US); Alex Averbuch, Buffalo Grove, IL (US); Weimin Huang, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 354 days.

(21) Appl. No.: 18/077,734

(22) Filed: Dec. 8, 2022

(65) Prior Publication Data

US 2024/0194056 A1 Jun. 13, 2024

(51) Int. Cl.

*G08G 1/01* (2006.01)
*G06Q 50/08* (2012.01)
*G06V 20/58* (2022.01)

(52) U.S. Cl.

CPC ........... *G08G 1/0112* (2013.01); *G06V 20/58* (2022.01); *G06Q 50/08* (2013.01)

(58) Field of Classification Search

CPC .... G08G 1/0112; G08G 1/0104; G06V 20/58; G06V 20/56; G06V 20/582; G06V 20/588; G06V 20/50; G06V 20/52; G06V 20/64; G06Q 50/08; B60W 30/181; B60W 30/0956; B60W 60/001; B60W 60/0011; B60W 60/00; B60W 60/0016; B60W 60/0017; B60W 60/0015; B60W 2552/53;

(Continued)

(56) References Cited

U.S. PATENT DOCUMENTS 9,221,461 B2 12/2015 Ferguson et al.
9,613,455 B1 * 4/2017 Nelson .................. G06V 20/10

(Continued)

FOREIGN PATENT DOCUMENTS

JP 6541388 B2 * 7/2019

OTHER PUBLICATIONS

Automated Detection of Construction Sites on Motorways (Year: 2017).*

(Continued)

*Primary Examiner* — Fadey S. Jabr
*Assistant Examiner* — Faris Asim Shaikh
(74) *Attorney, Agent, or Firm* — DITTHAVONG, STEINER & MLOTKOWSKI

(57) ABSTRACT

The disclosure provides a system, a method, and a computer program product for detecting a road work zone. The method comprises detecting a road object based on sensor data and map data. The method may include determining a first location associated with the road object based on location of a vehicle capturing the road object at a time of road object sighting and the sensor data. The method may include, based on image data captured by the vehicle at the time of road object sighting, determining a road object type and supplemental information associated with the road object. The method further includes, detecting the road work zone based on the first location, the road object type, and the supplemental information.

20 Claims, 11 Drawing Sheets

(58) Field of Classification Search

CPC ......... B60W 2552/50; B60W 2554/20; B60W 2754/30; G05D 1/0223; G05D 1/0214; G05D 1/0212; G05D 1/0231; G05D 1/0234; G05D 1/0246; G05D 1/0251; G05D 1/0253; G05D 3/00; G05D 2107/13; G05D 2107/90; G05D 2109/10; B60R 2300/105; B60R 2300/107; B60R 2300/10; G06T 11/00

See application file for complete search history.

(56) References Cited

U.S. PATENT DOCUMENTS 10,643,463 B2 5/2020 Thelen et al.
2005/0228584 A1* 10/2005 Adachi .................. G01C 21/30 340/995.1
2014/0067187 A1* 3/2014 Ferguson ........... B60W 60/0011 701/28
2014/0119605 A1* 5/2014 Zobel ................. G08G 1/09623 382/103
2014/0309833 A1* 10/2014 Ferguson ............. G06V 20/582 701/23
2016/0092755 A1* 3/2016 Fairfield ............... G01S 7/4802 382/104
2017/0242436 A1* 8/2017 Creusot .............. G08G 1/09626
2018/0315305 A1* 11/2018 Thelen ...................... G07C 5/08
2019/0325236 A1* 10/2019 Zaba ....................... G06N 20/00
2019/0353499 A1* 11/2019 Stenneth ............. G06F 3/04817
2019/0373408 A1* 12/2019 Neumann ............. H04W 4/029
2020/0018604 A1* 1/2020 Zhang .................. G06V 20/582
2020/0050973 A1* 2/2020 Stenneth ............ G01C 21/3815
2020/0133294 A1* 4/2020 Viswanathan ....... G05D 1/0088
2020/0191576 A1* 6/2020 Zhang ................ G01C 21/3691
2020/0192397 A1 6/2020 Zhang et al.
2020/0210696 A1* 7/2020 Hou ..................... G06V 10/242
2020/0240801 A1* 7/2020 Zhang ................ G01C 21/3841
2020/0364473 A1* 11/2020 Silver ................. B60W 30/146
2020/0400440 A1* 12/2020 Stenneth .............. G08G 1/0968
2021/0142661 A1* 5/2021 Sheynman ........... G08G 1/0133
2021/0148090 A1* 5/2021 Hashimoto ........... E02F 3/7618
2021/0335132 A1* 10/2021 Zhang .................. G06V 20/582
2023/0152800 A1* 5/2023 Stenneth ........... B60W 60/0053 701/25

OTHER PUBLICATIONS

Translation of JP-6541388-B2 retrieved from (Year: 2024).*
Traffic-sign detection ViCOS Lab (Year: 2021).*
Kunz et al., "Automated Detection of Construction Sites on Motorways", IEEE Intelligent Vehicles Symposium, Jun. 2017, 8 pages.

* cited by examiner

SYSTEM AND METHOD FOR DETERMINING ROAD WORK ZONE START LOCATION

TECHNOLOGICAL FIELD

The present disclosure generally relates to routing and navigation applications, and more particularly relates to systems and methods for determining a road work zone for routing and navigation applications.

BACKGROUND

Various navigation applications are available to provide directions for driving, walking, or other modes of travel. Web sites and mobile applications offer map applications that allow a user to request directions from one point to another. Navigation devices based on Global Positioning System (GPS) technology have become common, and these systems can determine the location of a device to provide directions to drivers, pedestrians, cyclists, and the like. As part of navigation process, it is important for users of vehicles, autonomous and semi-autonomous vehicles both, to detect road signs, such as, "men at work" sign, "roadwork ahead" sign, "road work zone" sign, "road works" sign, etc., or temporary signs such as barrier boards, etc. with accurate positioning of these signs. These signs are normally placed in the vicinity of road works zone but does not provide specific details such as the start location of the road work zone. Moreover, especially for precise navigation assistance particularly in the context of autonomous and semi-autonomous vehicles, identifying start location of the road work zone well in advance is of utmost importance to avoid collisions and undue mishaps In addition, detecting start location of a road work zone in advance enables a user to safely transition the autonomous vehicles from autonomous driving mode to manual driving mode. Likewise, using end location of the road works zone, the user can transition the autonomous vehicles from manual driving mode. mode back to autonomous mode.

Therefore, there is a need for improved systems and methods for determining road work zone start location.

BRIEF SUMMARY

Accordingly, in order to provide accurate, safe, and reliable navigation applications, it is important to update map data to reflect real time changes in route conditions, like start location of the road work zone. Further, safer, and user-oriented navigation services can be provided to the end users. To this end, the data utilized for providing the navigation application, such as navigation assistance should consider accurate and up-to-date navigation instructions for passage of a vehicle through various regions and routes. Especially, in the context of navigation assistance for autonomous vehicles and semi-autonomous vehicles, to avoid inaccurate navigation, it is important that the assistance provided is real-time, up-to-date, safe, and accurate. There is a need of a system that may detect a road work zone, and update map data based on the real time observations. Example embodiments of the present disclosure provide a system, a method, and a computer program product for method and a computer programmable product are provided for implementing a process of detecting a road work zone in order to overcome the challenges discussed above, to provide the solutions envisaged as discussed above.

A system, a method and a computer programmable product are provided for implementing a process of detecting a road work zone.

Some example embodiments disclosed herein provide a method, a system, and a computer programmable for implementing a process of detecting a road work zone. The method comprises detecting a road object based on sensor data and map data. The method may include determining a first location associated with the road object based on location of a vehicle capturing the road object at a time of road object sighting and the sensor data. The method may further include, based on image data captured by the vehicle at the time of road object sighting, determining a road object type and supplemental information associated with the road object. Further, the method may include detecting the road work zone based on the first location, the road object type, and the supplemental information.

According to some example embodiments, the supplemental information comprises distance information and unit information associated with the road object type According to some example embodiments, the method further comprises projecting the supplemental information from the first location along a route of the vehicle, until a distance measure associated with the distance information is reached. The method may include identifying a second location based on the projection. The method may further include determining the second location as a start location of the detected work zone.

According to some example embodiments, the method further comprising clustering a plurality of locations associated with a plurality of road observations for the road object, wherein each location in the plurality of locations is the corresponding second location for that road observation. The method may include determining a centroid location for the cluster of the plurality of locations. The method may further include determining the road work zone start location based on the determined centroid.

According to some example embodiments, the road object type is a start of construction indication sign.

According to some example embodiments, the plurality of locations is on the same route, same direction and within a distance threshold.

According to some example embodiments, the centroid is a mean location of the plurality of locations in a same cluster.

According to some example embodiments, the clustering is done using a DB-SCAN algorithm.

According to some example embodiments, the distance information comprising at least of an integer.

In one aspect, a system for detecting a road work zone is disclosed. The system comprises a memory configured to store computer-executable instructions; and at least one processor configured to execute the computer-executable instructions to detect a road object based on sensor data and map data. The at least one processor is further configured to determine a first location associated with the road object based on location of a vehicle capturing the road object at a time of road object sighting and the sensor data. The at least one processor is further configured to, based on image data captured by the vehicle at the time of road object sighting, determine a road object type and supplemental information associated with the road object. Also, the at least one processor is configured to detect the road work zone based on the first location, the road object type, and the supplemental information.

In yet another aspect, a computer program product comprising a non-transitory computer readable medium having stored thereon computer executable instructions which when executed by at least one processor, cause the processor to carry out operations for detecting a road work zone, the operations comprising detecting a road object based on sensor data and map data. The operations further comprise determining a first location associated with the road object based on location of a vehicle capturing the road object at a time of road object sighting and the sensor data. The operations further comprise based on image data captured by the vehicle at the time of road object sighting, determining a road object type and supplemental information associated with the road object. The operations further comprise detecting the road work zone based on the first location, the road object type, and the supplemental information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
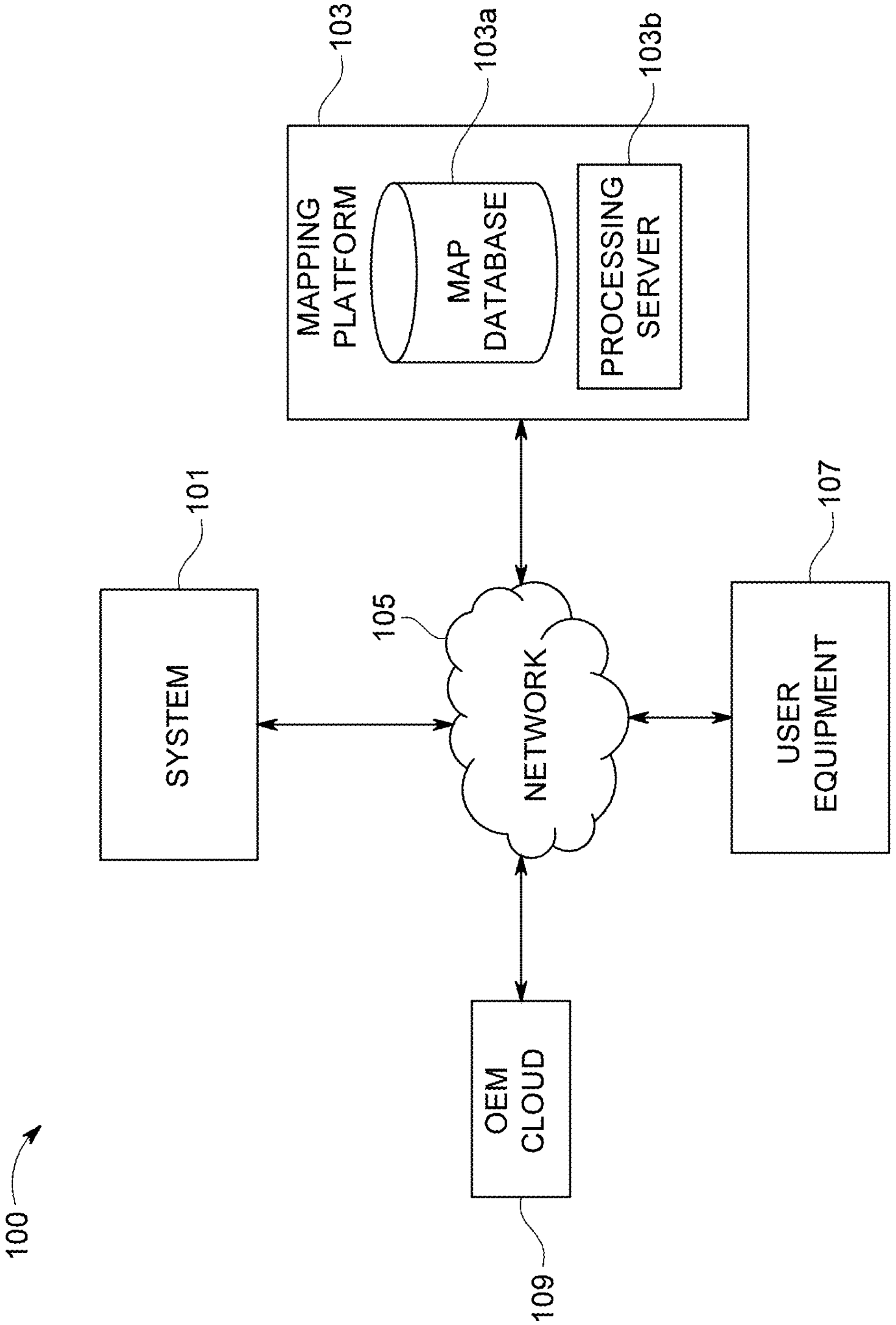
Figure 2A:
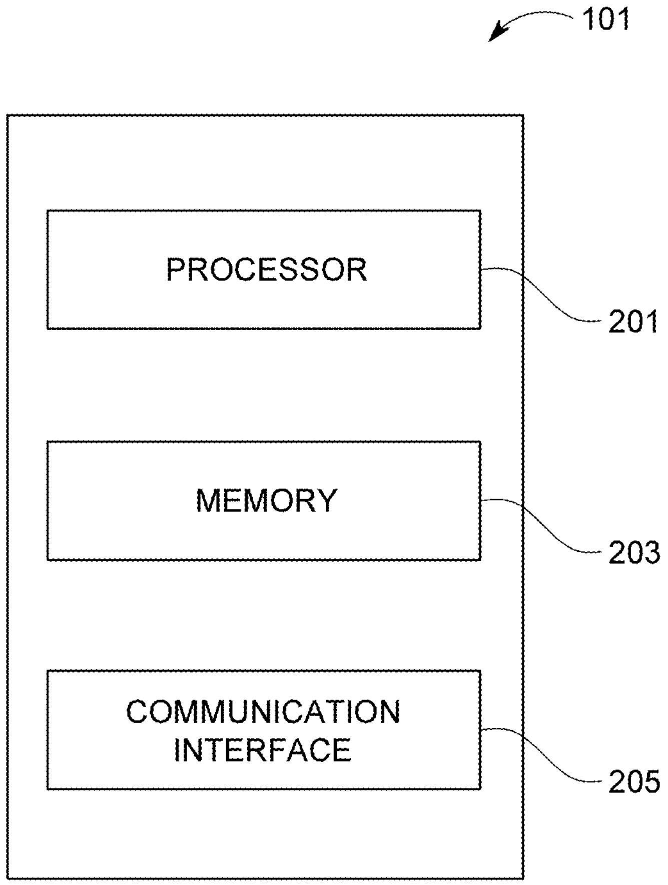
Figure 2B:
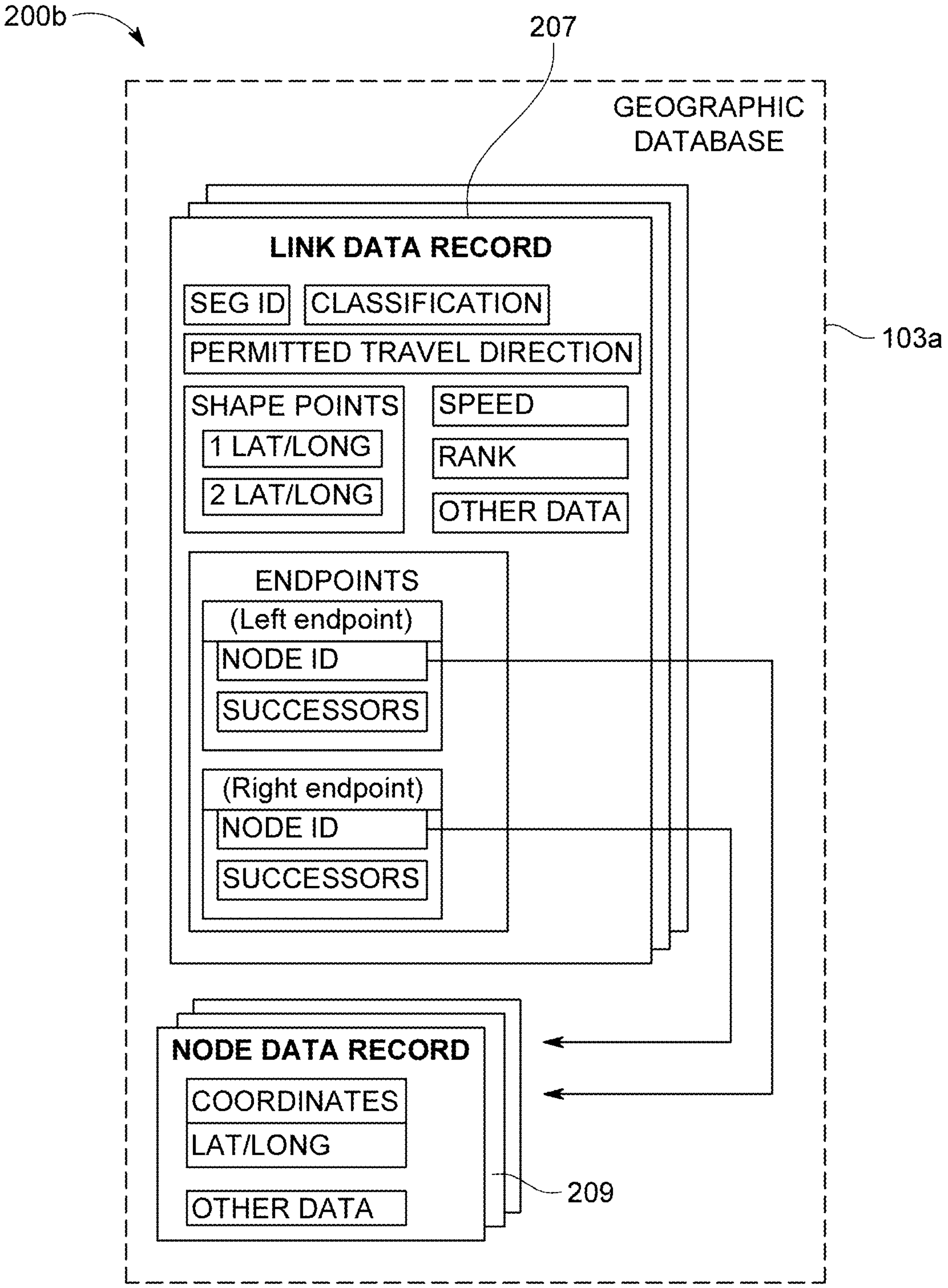
Figure 2C:
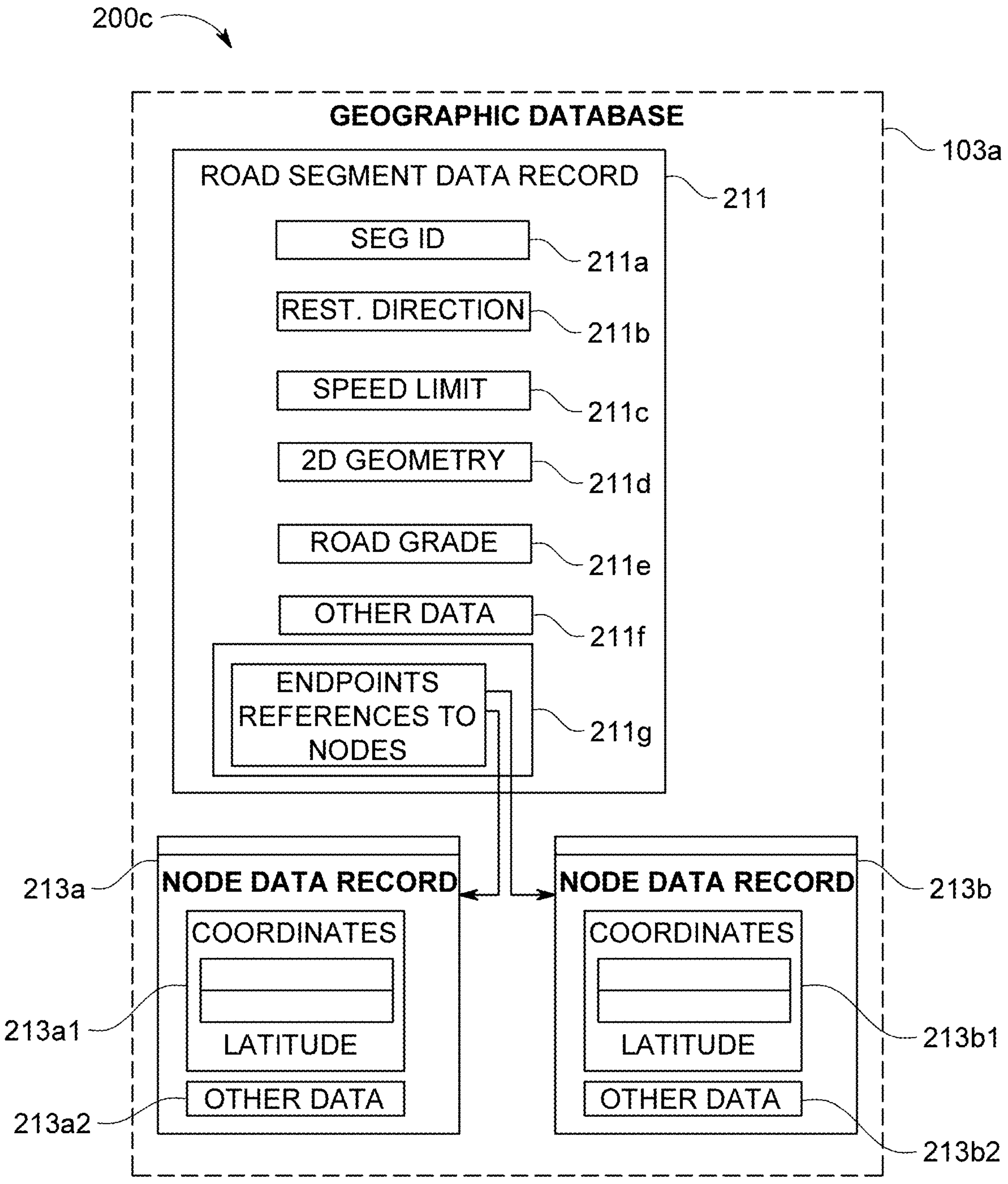
Figure 2D:
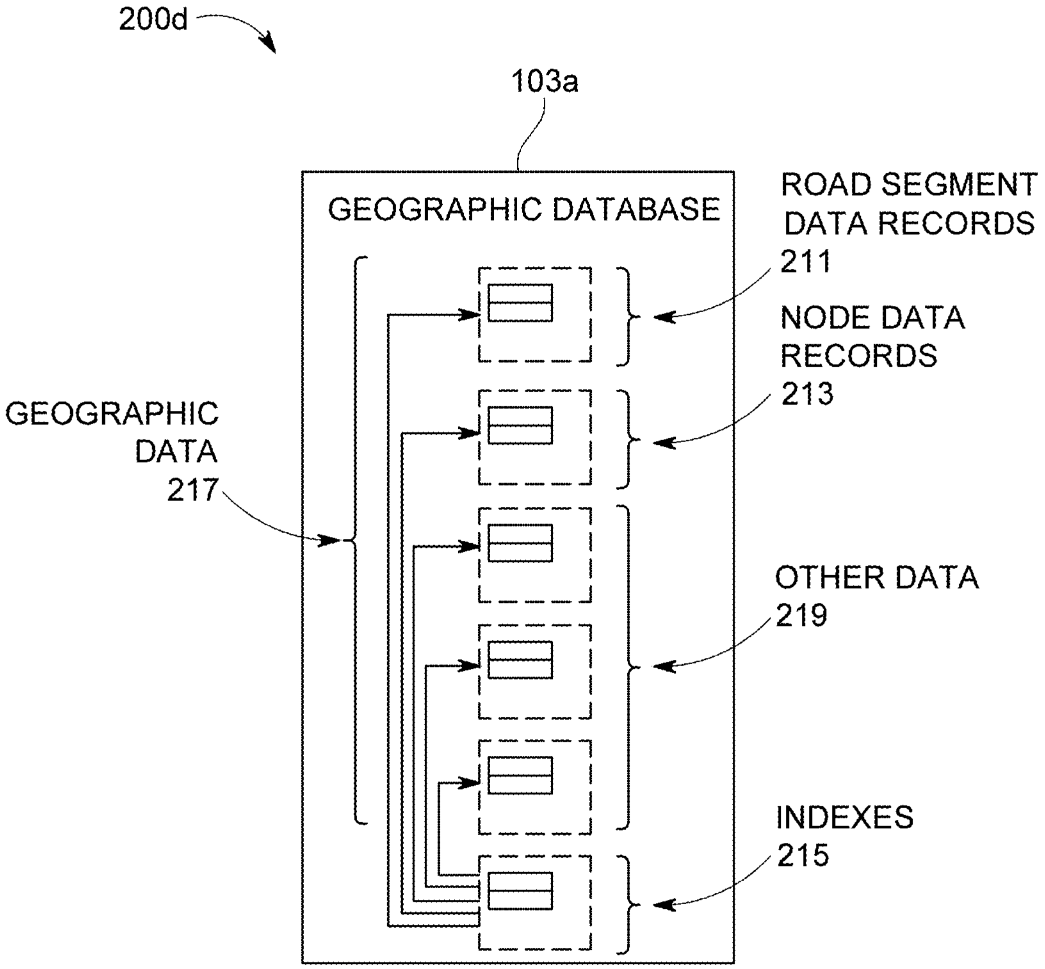
Figure 3:
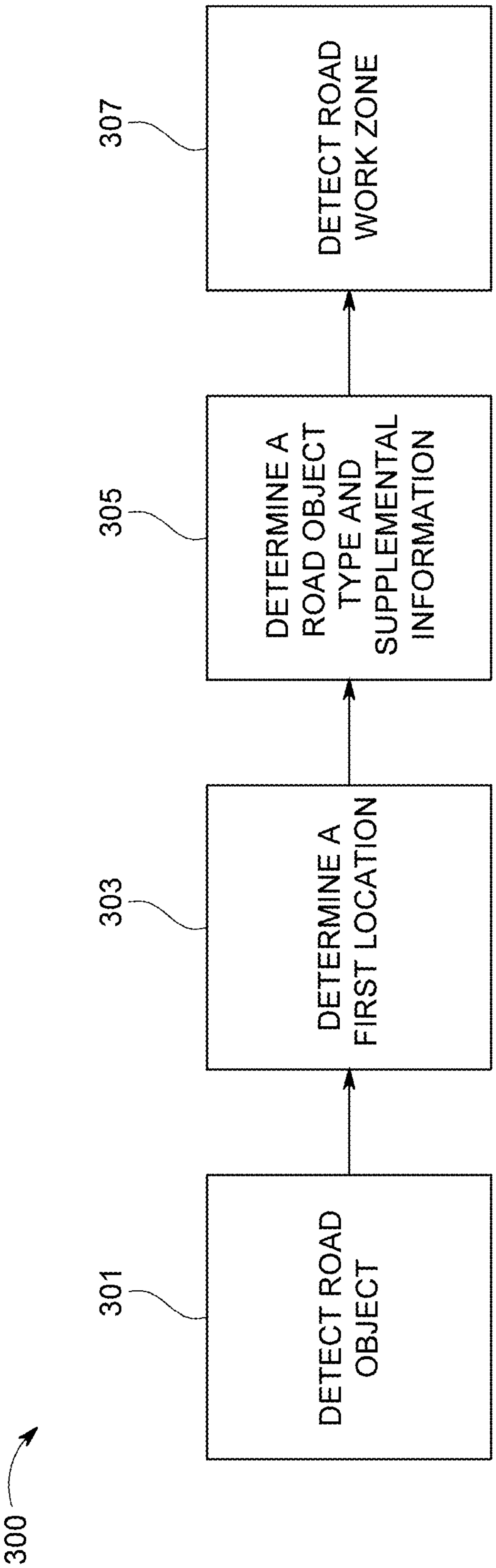
Figure 4A:
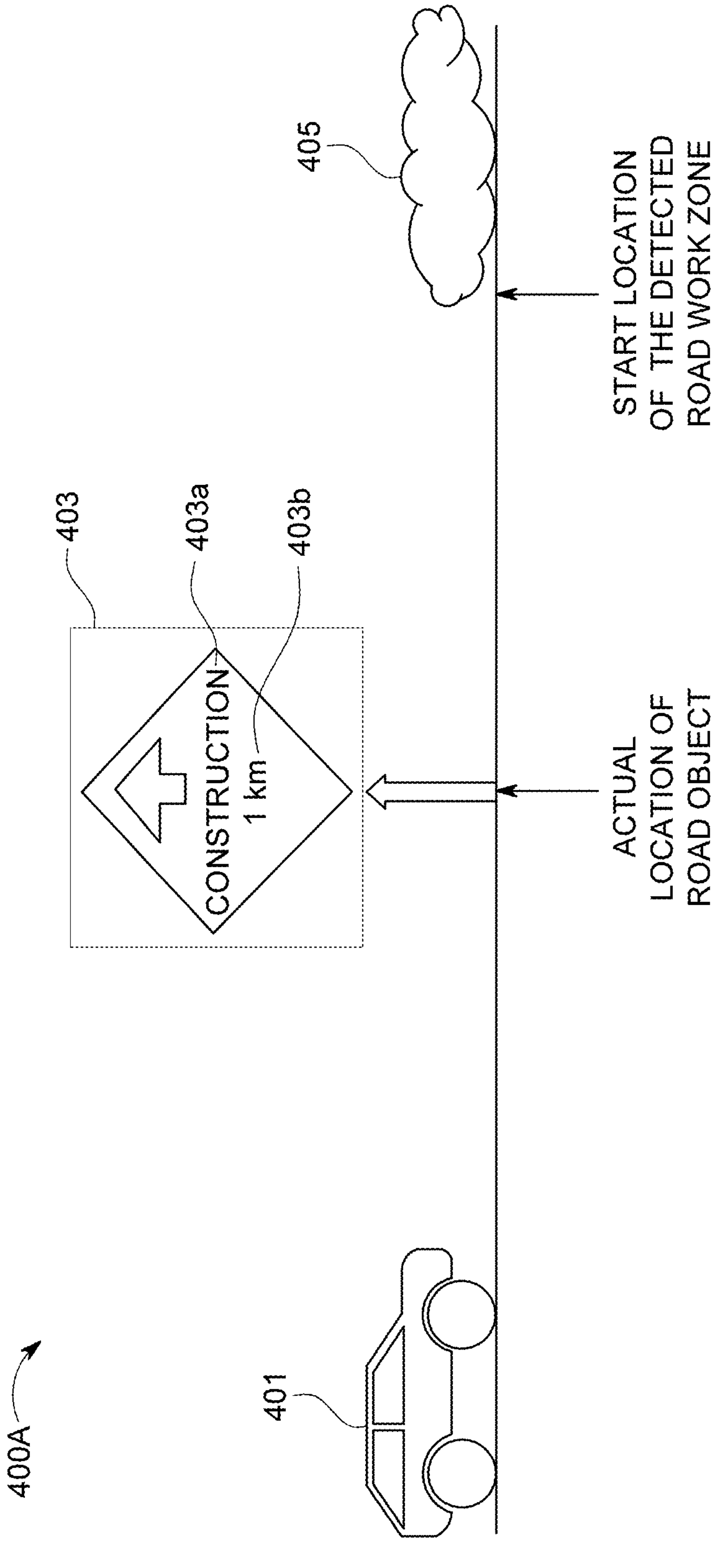
Figure 4B:
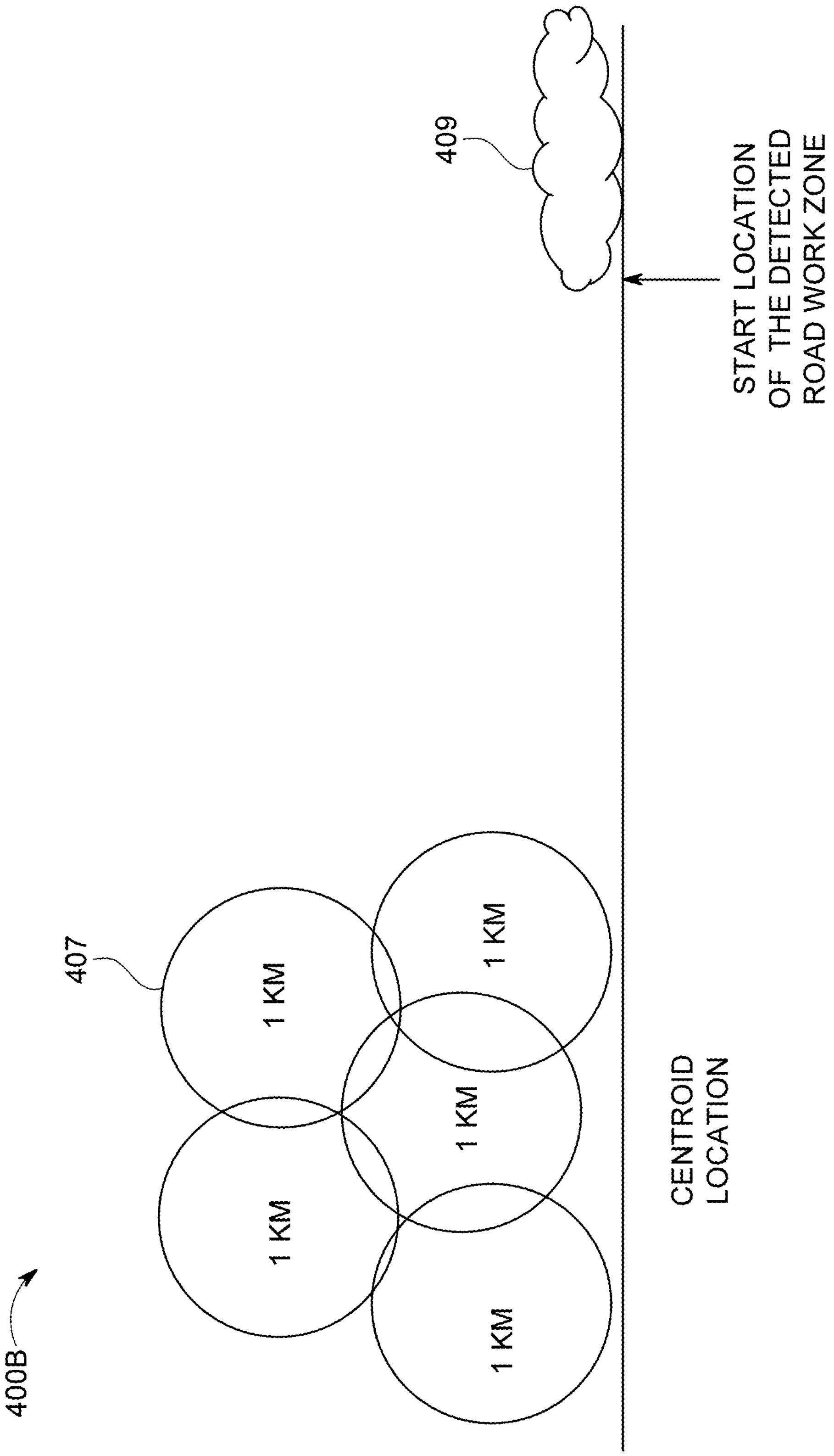
Figure 5:
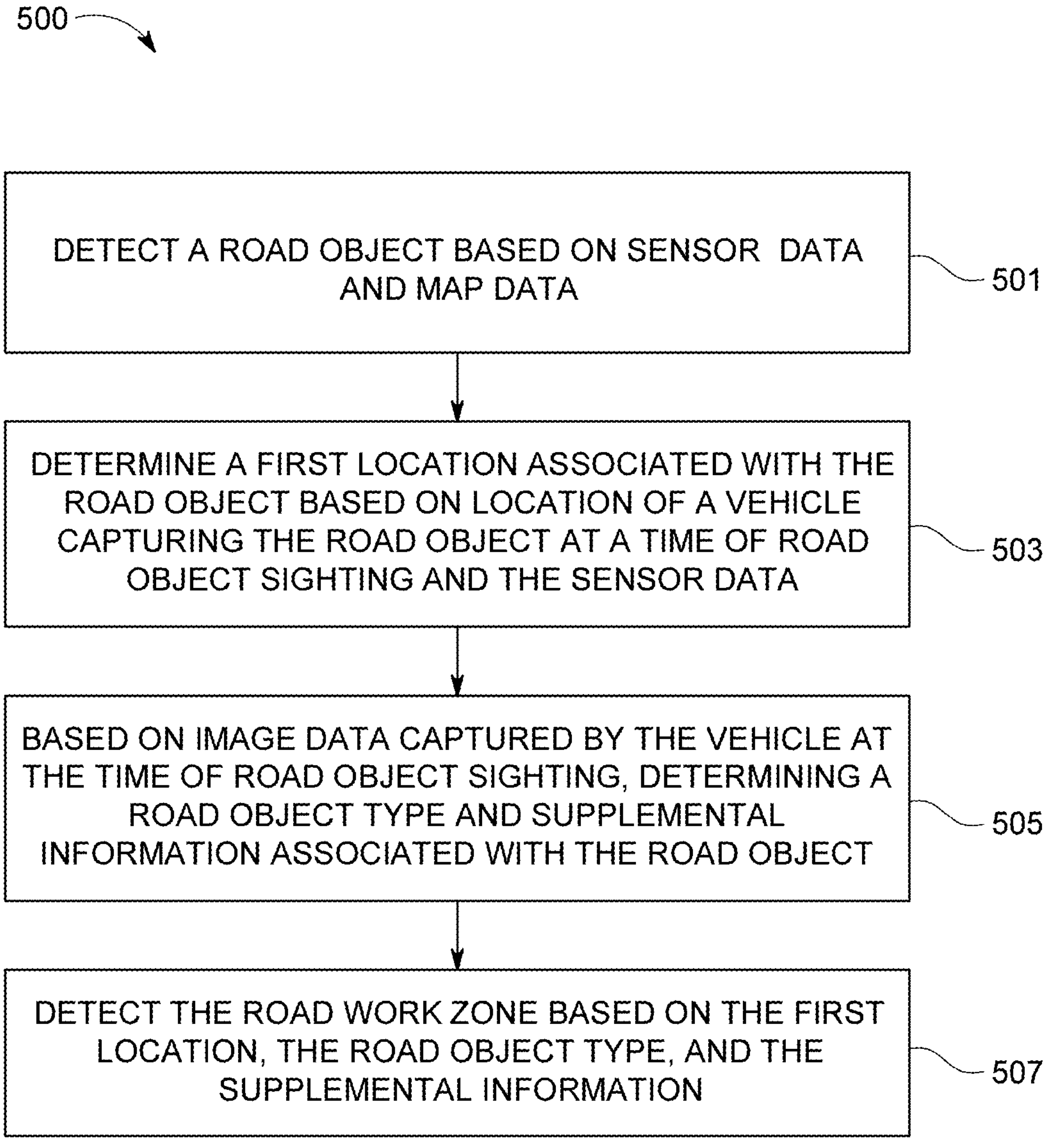
Figure 6:
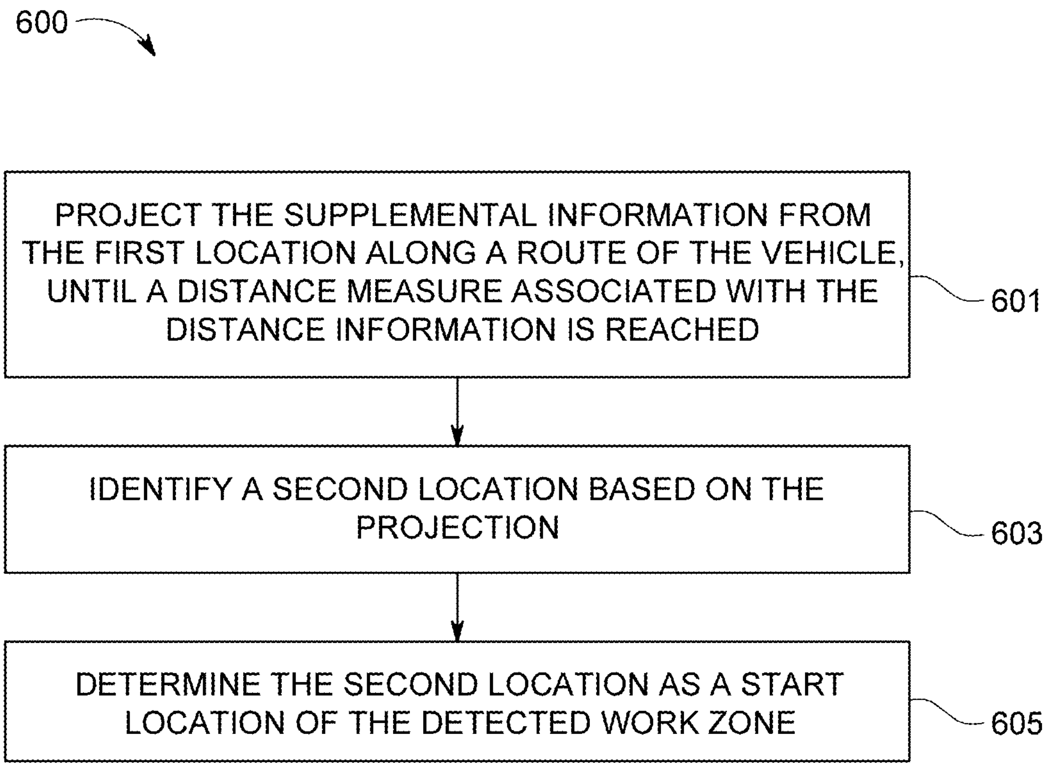
Figure 7:
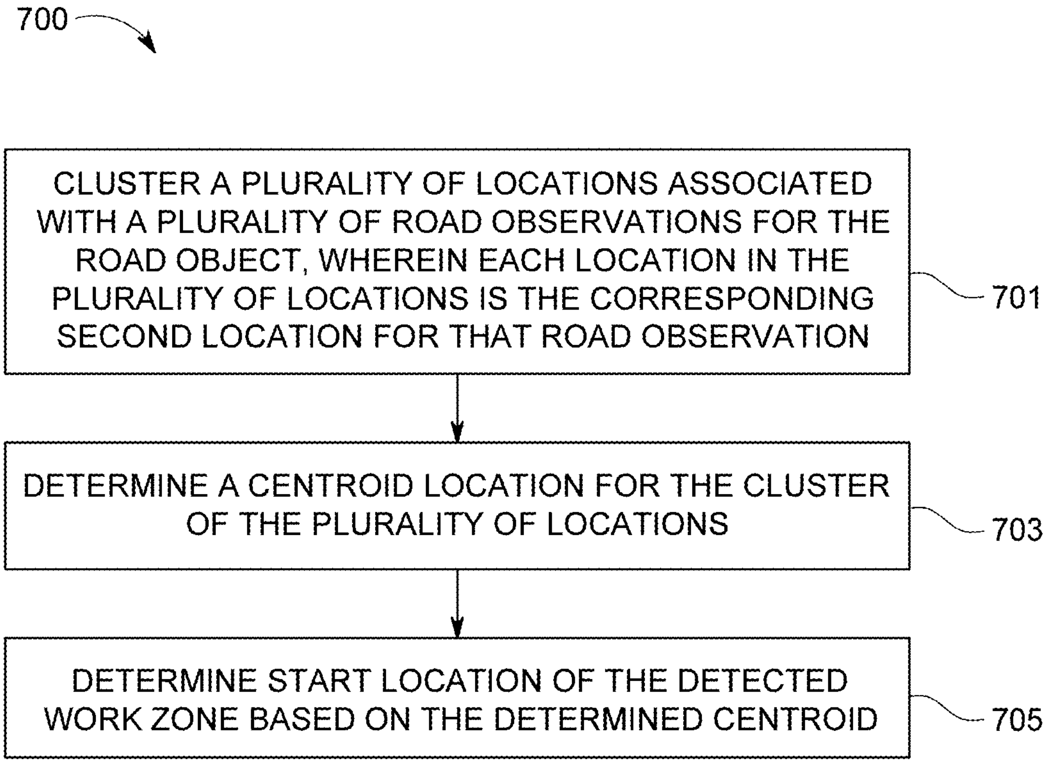

Having thus described example embodiments of the invention in general terms, reference will now be made to the accompanying drawings, which are not necessarily drawn to scale, and wherein:

FIG. 1 illustrates a schematic diagram of a network environment of a system for detecting a road work zone, in accordance with an example embodiment:

FIG. 2A illustrates a block diagram of the system for detecting a road work zone, in accordance with an example embodiment:

FIG. 2B illustrates an exemplary map database record storing data, in accordance with one or more example embodiments:

FIG. 2C illustrates another exemplary map database record storing data, in accordance with one or more example embodiments:

FIG. 2D illustrates another exemplary map database storing data, in accordance with one or more example embodiments:

FIG. 3 illustrates a block diagram of the system of FIG. 2A, in accordance with an example embodiment:

FIGS. 4A-4B illustrate schematic diagrams showing determining a start location of a detected road work zone, in accordance with an example embodiment:

FIG. 5 illustrates a flow chart of the method for detecting a road work zone, in accordance with an example embodiment:

FIG. 6 illustrates a flowchart of the method for determining start location of the detected work zone, in accordance with an example embodiment: and FIG. 7 illustrates a flow diagram of a method for determining start location of the detected work zone, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to “one embodiment” or “an embodiment” means that a particular feature, structure, or characteristic described in connection with the embodiment is included in at least one embodiment of the present disclosure. The appearance of the phrase “in one embodiment” in various places in the specification are not necessarily all referring to the same embodiment, nor are separate or alternative embodiments mutually exclusive of other embodiments. Further, the terms “a” and “an” herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein: rather, these embodiments are provided so that this disclosure will satisfy applicable legal requirements. Like reference numerals refer to like elements throughout. As used herein, the terms “data,” “content,” “information,” and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term ‘circuitry’ may refer to (a) hardware-only circuit implementations (for example, implementations in analog circuitry and/or digital circuitry): (b) combinations of circuits and computer program product (s) comprising software and/or firmware instructions stored on one or more computer readable memories that work together to cause an apparatus to perform one or more functions described herein: and (c) circuits, such as, for example, a microprocessor(s) or a portion of a microprocessor(s), that require software or firmware for operation even if the software or firmware is not physically present. This definition of ‘circuitry’ applies to all uses of this term herein, including in any claims. As a further example, as used herein, the term ‘circuitry’ also includes an implementation comprising one or more processors and/or portion(s) thereof and accompanying software and/or firmware. As another example, the term ‘circuitry’ as used herein also includes, for example, a baseband integrated circuit or applications processor integrated circuit for a mobile phone or a similar integrated circuit in a server, a cellular network device, other network device, and/or other computing device.

As defined herein, a “computer-readable storage medium,” which refers to a non-transitory physical storage medium (for example, volatile or non-volatile memory device), can be differentiated from a “computer-readable transmission medium,” which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "route" may be used to refer to a path from a source location to a destination location on any link.

The term "autonomous vehicle" may refer to any vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

The term "road works or road work zones" may refer to a section of a road, an entire road, or a sequence of roads that are occupied for the purpose of, for example, road surface repairs, work on power lines, water works and road accidents. In certain scenarios, the roadwork may disable an entire lane temporarily. As a result, travelers may experience delays and increased travel time on a road as compared to a road without roadwork. In some scenarios, drivers near a road work zone may have to drive skillfully and slowly. In certain other scenarios, the vehicles on a lane affected by the roadwork may be directed by road administration to take a detour via longer possible route. Consequently, the drivers and passengers may experience wastage of time and energy.

End of Definitions

Embodiments of the present disclosure may provide a system, a method, and a computer program product for detecting a road work zone. As part of navigation process, it is important for users of vehicles, autonomous and semi-autonomous vehicles both, to detect road signs, such as, "men at work" sign, "roadwork ahead" sign, "road work zone" sign, "road works" sign, etc., or temporary signs such as barrier boards, etc. with accurate positioning of these signs. These signs are normally placed in the vicinity of road works zone but does not provide specific details such as the start location of the road work zone. Moreover, especially for precise navigation assistance particularly in the context of autonomous and semi-autonomous vehicles, identifying start location of the road work zone well in advance is of utmost importance to avoid collisions and undue mishaps In addition, using road work zone start locations a user can transition the autonomous vehicles from autonomous driving mode to manual driving mode. Likewise, using road works zone end locations, the user can transition the autonomous vehicles from manual driving mode. mode back to autonomous mode.

To that end, it would be advantageous to provide methods and systems that facilitate detecting a road work zone in such an improved manner are described with reference to FIG. 1 to FIG. 7 as detailed below.

FIG. 1 illustrates a schematic diagram of a network environment 100 of a system 101 for detecting a road work zone, in accordance with an example embodiment. The system 101 may be communicatively coupled to a mapping platform 103, a user equipment 107 and an OEM (Original Equipment Manufacturer) cloud 109, via a network 105. The components described in the network environment 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud-based service, a cloud-based application, a remote server-based service, a remote server-based application, a virtual computing system, a remote server platform or a cloud-based platform. As such, the system 101 may be configured to operate outside the user equipment 107. However, in some example embodiments, the system 101 may be embodied within the user equipment 107, for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to generate navigation information in a region. Further, in one embodiment, the system 101 may be a standalone unit configured to generate navigation information in the region for the vehicle. Alternatively, the system 101 may be coupled with an external device such as the autonomous vehicle. In some embodiments, the system 101 may be a processing server **103*b* of the mapping platform 103 and therefore may be co-located with or within the mapping platform 103. In some other embodiments, the system 101 may be an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103**.

The mapping platform 103 may comprise a map database **103*a* for storing map data and a processing server 103*b*. The map database 103*a* may store node data, road segment data, link data, point of interest (POI) data, link identification information, heading value records, data about various geographic zones, regions, pedestrian data for different regions, heatmaps or the like. Also, the map database 103*a* further includes speed limit data of different lanes, cartographic data, routing data, and/or maneuvering data. Additionally, the map database 103*a* may be updated dynamically to cumulate real time traffic data. The real time traffic data may be collected by analyzing the location transmitted to the mapping platform 103 by a large number of road users through the respective user devices of the road users. In one example, by calculating the speed of the road users along a length of road, the mapping platform 103 may generate a live traffic map, which is stored in the map database 103*a* in the form of real time traffic conditions. In an embodiment, the map database 103*a* may store data of different zones in a region. In one embodiment, the map database 103*a* may further store historical traffic data that includes travel times, average speeds and probe counts on each road or area at any given time of the day and any day of the year. In an embodiment, the map database 103*a* may store the probe data over a period of time for a vehicle to be at a link or road at a specific time. The probe data may be collected by one or more devices in the vehicle such as one or more sensors or image capturing devices or mobile devices. In an embodiment, the probe data may also be captured from connected-car sensors, smartphones, personal navigation devices, fixed road sensors, smart-enabled commercial vehicles, and expert monitors observing accidents and construction. In an embodiment, the map data in the map database 103***a* may be in the form of map tiles. Each map tile may denote a map tile area comprising plurality of road segments or links in it. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities. Optionally, the map database 103*a* may contain path segment and node data records, such as shape points or other data that may represent pedestrian paths, links, or areas in addition to or instead of the vehicle road record data, for example. The road/link and nodes can be associated with attributes, such as geographic coordinates, street names, address ranges, speed limits, turn restrictions at intersections, and other navigation related attributes. The map database 103*a* may also store data about the POIs and their respective locations in the POI records. The map database 103*a* may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103*a* may include event data (e.g., traffic incidents, construction activities, scheduled events, unscheduled events, accidents, diversions etc.) associated with the POI data records or other records of the map database 103*a* associated with the mapping platform 103. Optionally, the map database 103*a* may contain path segment and node data records or other data that may represent pedestrian paths or areas in addition to or instead of the autonomous vehicle road record data.

In some embodiments, the map database 103*a* may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, navigation instruction generation and other functions, by a navigation device, such as by the user equipment 107. The navigation-related functions may correspond to vehicle navigation, pedestrian navigation, navigation instruction suppression, navigation instruction generation based on user preference data or other types of navigation. The compilation to produce the end user databases may be performed by a party or entity separate from the map developer. For example, a customer of the map developer, such as a navigation device developer or other end user device developer, a navigation app service provider and the like may perform compilation on a received map database in a delivery format to produce one or more compiled navigation databases.

As mentioned above, the map database 103*a* may be a master geographic database, but in alternate embodiments, the map database 103*a* may be embodied as a client-side map database and may represent a compiled navigation database that may be used in or with end user equipment such as the user equipment 107 to provide navigation and/or map-related functions. For example, the map database 103*a* may be used with the user equipment 107 to provide an end user with navigation features. In such a case, the map database 103*a* may be downloaded or stored locally (cached) on the user equipment 107.

The processing server 103*b* may comprise processing means, and communication means. For example, the processing means may comprise one or more processors configured to process requests received from the user equipment 107. The processing means may fetch map data from the map database 103*a* and transmit the same to the user equipment 107 via OEM cloud 109 in a format suitable for use by the user equipment 107. In one or more example embodiments, the mapping platform 103 may periodically communicate with the user equipment 107 via the processing server 103*b* to update a local cache of the map data stored on the user equipment 107. Accordingly, in some example embodiments, the map data may also be stored on the user equipment 107 and may be updated based on periodic communication with the mapping platform 103.

In some example embodiments, the user equipment 107 may be any user accessible device such as a mobile phone, a smartphone, a portable computer, and the like, as a part of another portable/mobile object such as a vehicle. The user equipment 107 may comprise a processor, a memory, and a communication interface. The processor, the memory and the communication interface may be communicatively coupled to each other. In some example embodiments, the user equipment 107 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 107 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 107. Additional, different, or fewer components may be provided. In one embodiment, the user equipment 107 may be directly coupled to the system 101 via the network 105. For example, the user equipment 107 may be a dedicated vehicle (or a part thereof) for gathering data for development of the map data in the database 103*a*. In some example embodiments, at least one user equipment such as the user equipment 107 may be coupled to the system 101 via the OEM cloud 109 and the network 105. For example, the user equipment 107 may be a consumer vehicle (or a part thereof) and may be a beneficiary of the services provided by the system 101. In some example embodiments, the user equipment 107 may serve the dual purpose of a data gatherer and a beneficiary device. The user equipment 107 may be configured to capture sensor data associated with a road which the user equipment 107 may be traversing. The sensor data may for example be image data of road objects, road signs, or the surroundings. The sensor data may refer to sensor data collected from a sensor unit in the user equipment 107. In accordance with an embodiment, the sensor data may refer to the data captured by the vehicle using sensors. The user equipment 107, may be communicatively coupled to the system 101, the mapping platform 103 and the OEM cloud 109 over the network 105.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 105 is coupled directly or indirectly to the user equipment 107 via the OEM cloud 109. In an example embodiment, the system may be integrated in the user equipment 107. In an example, the mapping platform 103 may be integrated into a single platform to provide a suite of mapping and navigation related applications for OEM devices, such as the user devices and the system 101. The system 101 may be configured to communicate with the mapping platform 103 over the network 105. Thus, the mapping platform 103 may enable provision of cloud-based services for the system 101, such as, updating data about road signs in the OEM cloud 109 in batches or in real-time.

FIG. 2A illustrates a block diagram 200*a* of the system 101 for detecting a road work zone, in accordance with an example embodiment. The system 101 may include at least one processor 201 (hereinafter, also referred to as "processor 201"), at least one memory 203 (hereinafter, also referred to as "memory 203"), and at least one communication interface 205 (hereinafter, also referred to as "communication interface 205").

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101. In some embodiments, the users may be or correspond to an autonomous or a semi-autonomous vehicle. The IoT related capabilities may in turn be used to provide smart navigation solutions by providing real time updates to the users to take pro-active decision on turn-maneuvers, lane changes and the like, big data analysis, traffic redirection, and sensor-based data collection by using the cloud-based mapping system for providing navigation recommendation services to the users. The system 101 may be accessed using the communication interface 205. The communication interface 205 may provide an interface for accessing various features and data stored in the system 101. Further, from the user equipment 107, at least one location on map is received.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to conduct various functions in accordance with an example embodiment of the present invention. For example, the memory 203 may be configured to buffer input data for processing by the processor 201.

As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the user equipment 107 or any other component with which the system 101 may communicate. The communication interface 205 may be any means such as a device or circuitry embodied in either hardware or a combination of hardware and software that is configured to receive and/or transmit data to/from a communications device in communication with the user equipment 107. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms for enabling the system 101 to carry out information exchange functions in many different forms of communication environments. The communication interface enables exchange of information and instructions for updating map data stored in the map database 103*a*.

FIG. 2B shows format of the map data 200*b* stored in the map database 103*a* according to one or more example embodiments. FIG. 2B shows a link data record 207 that may be used to store data about one or more of the feature lines. This link data record 207 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 207 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record 207 that represents another-than-straight road segment may include shape point data. A shape point is a location along a link between its endpoints. To represent the shape of other-than-straight roads, the mapping platform 103 and its associated map database developer selects one or more shape points along the other-than-straight road portion. Shape point data included in the link data record 207 indicate the position, (e.g., latitude, longitude, and optionally, altitude or elevation) of the selected shape points along the represented link.

Additionally, in the compiled geographic database, such as a copy of the map database 103*a*, there may also be a node data record 209 for each node. The node data record 209 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function but excludes data and attributes that are not needed for performing the function. Thus, the map data may be alternately stored in a format suitable for performing types of navigation functions, and further may be provided on-demand, depending on the type of navigation function.

FIG. 2C shows another format of the map data 200*c* stored in the map database 103*a* according to one or more example embodiments. In the FIG. 2C, the map data 200*c* is stored by specifying a road segment data record 211. The road segment data record 211 is configured to represent data that represents a road network. In FIG. 2C, the map database 103*a* contains at least one road segment data record 211 (also referred to as "entity" or "entry") for each road segment in a geographic region.

The map database 103*a* that represents the geographic region of FIG. 2A also includes a database record 213 (a node data record 213*a* and a node data record 213*b*) (or "entity" or "entry") for each node associated with the at least one road segment shown by the road segment data record 211. (The terms "nodes" and "segments" represent only one terminology for describing these physical geographic features and other terminology for describing these features is intended to be encompassed within the scope of these concepts). Each of the node data records 213*a* and 213*b* may have associated information (such as "attributes", "fields", etc.) that allows identification of the road segment(s) that connect to it and/or its geographic position (e.g., its latitude and longitude coordinates).

FIG. 2C shows some of the components of the road segment data record 211 contained in the map database 103*a*. The road segment data record 211 includes a segment ID 211*a* by which the data record can be identified in the map database 103*a*. Each road segment data record 211 has associated with it information (such as "attributes", "fields", etc.) that describes features of the represented road segment. The road segment data record 211 may include data 211*b* that indicate the restrictions, if any, on the direction of vehicular travel permitted on the represented road segment. The road segment data record 211 includes data 211*c* that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 211 may also include data 211*d* indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 211 also includes road grade data 211*e* that indicate the grade or slope of the road segment. In one embodiment, the road grade data 211*e* include road grade change points and a corresponding percentage of grade change. Additionally, the road grade data 211*e* may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 211*e* includes the road grade change points and an actual road grade value for the portion of the road segment after the road grade change point until the next road grade change point or end node. In a further embodiment, the road grade data 211*e* includes elevation data at the road grade change points and nodes. In an alternative embodiment, the road grade data 211*e* is an elevation model which may be used to determine the slope of the road segment.

The road segment data record 211 also includes data 211*g* providing the geographic coordinates (e.g., the latitude and longitude) of the end points of the represented road segment. In one embodiment, the data 211*g* are references to the node data records 211 that represent the nodes corresponding to the end points of the represented road segment.

The road segment data record 211 may also include or be associated with other data 211*f* that refer to various other attributes of the represented road segment. The various attributes associated with a road segment may be included in a single road segment record or may be included in more than one type of record which cross-reference each other. For example, the road segment data record 211 may include data identifying the name or names by which the represented road segment is known, the street address ranges along the represented road segment, and so on.

FIG. 2C also shows some of the components of the node data record 213 contained in the map database 103*a*. Each of the node data records 213 may have associated information (such as "attributes", "fields", etc.) that allows identification of the road segment(s) that connect to it and/or it's geographic position (e.g., its latitude and longitude coordinates). For the embodiment shown in FIG. 2C, the node data records 213*a* and 213*b* include the latitude and longitude coordinates 213*a*1 and 213*b*1 for their nodes. The node data records 213*a* and 213*b* may also include other data 213*a*2 and 213*b*2 that refer to various other attributes of the nodes.

Thus, the overall data stored in the map database 103*a* may be organized in the form of different layers for greater detail, clarity, and precision. Specifically, in the case of high-definition maps, the map data may be organized, stored, sorted, and accessed in the form of three or more layers. These layers may include road level layer, lane level layer and localization layer. The data stored in the map database 103*a* in the formats shown in FIGS. 2B and 2C may be combined in a suitable manner to provide these three or more layers of information. In some embodiments, there may be lesser or fewer number of layers of data also possible, without deviating from the scope of the present disclosure.

FIG. 2D illustrates a block diagram 200*d* of the map database 103*a* storing map data or geographic data 217 in the form of road segments/links, nodes, and one or more associated attributes as discussed above. Furthermore, attributes may refer to features or data layers associated with the link-node database, such as an HD lane data layer.

In addition, the map data 217 may also include other kinds of data 219. The other kinds of data 219 may represent other kinds of geographic features or anything else. The other kinds of data may include point of interest data. For example, the point of interest data may include point of interest records comprising a type (e.g., the type of point of interest, such as restaurant, ATM, etc.), location of the point of interest, a phone number, hours of operation, etc. The map database 103*a* also includes indexes 215. The indexes 215 may include various types of indexes that relate the different types of data to each other or that relate to other aspects of the data contained in the geographic database 103*a*.

The data stored in the map database 103*a* in the various formats discussed above may help in provide precise data for high-definition mapping applications, autonomous vehicle navigation and guidance, cruise control using ADAS, direction control using accurate vehicle maneuvering and other such services. In some embodiments, the system 101 accesses the map database 103*a* storing data in the form of various layers and formats depicted in FIGS. 2B-2D.

FIG. 3 is a block diagram of the system 101, in accordance with an example embodiment. Starting at block 301, the system 101 may be configured to detect a road object based on sensor data and map data. In accordance with an embodiment, the sensor data may refer to the data captured by the vehicle using sensors. As discussed in FIG. 1, the user equipment 107 may be a dedicated vehicle (or a part thereof) for gathering data for development of the map data in the database 103*a*. The sensors may include acoustic sensors such as a microphone array, position sensors such as a GPS sensor, a gyroscope, a LIDAR sensor, a proximity sensor, motion sensors such as accelerometer, an image sensor such as a camera and the like. The road object includes various types of objects that are encountered on a route of travel of the user equipment 107. For example, when the user equipment 107 is a vehicle, the road object may be a road sign, such as a construction related sign or a road work zone sign, a road narrow sign, a speed limit sign, a road works detection sign, a traffic cone, a guide rail, and the like.

At block 303, the system 101 may be further configured to determine a first location associated with the road object based on location of a vehicle capturing the road object at a time of the road object sighting and the sensor data. In accordance with an example embodiment, the first location is the road object's actual location that may be determined by fusing the vehicle's location at the time of road object sighting with one or more positional offsets (latitude, longitude, vertical), that may be received in the sensor data.

In accordance with an example embodiment, after the first location associated with the road object is determined, the road object is then associated with a road or link via a point-based map matching. If the road object is successfully map matched, then the system 101 may be configured to proceed to the block 305.

At block 305, the system 101 may be further configured to, based on image data captured by the vehicle at the time of road object sighting, determine a road object type and supplemental information associated with the road object. In accordance with an embodiment, the road object type may be a start of construction sign. In accordance with an embodiment, the supplemental information comprises distance information and unit information of the distance associated with the road object type. In accordance with an embodiment, the distance information comprising at least of an integer. The unit information comprises, at least one of kilometers, miles, meters, yards, and the like.

In accordance with an example embodiment, the image data captured by the vehicle at the time of road object sighting, may be processed directly on the vehicle using a computer vision algorithm residing on the vehicle to determine the sign type and the supplemental information. Further, in an alternate embodiment, the vehicle may be enabled to send the sign type and supplemental information determined in the image data, directly, or in the form of text to the cloud. However, while transmitting this data, a vehicle identity may not be revealed to make the overall system 101 privacy aware.

In another example embodiment, the computer vision algorithm may reside in the cloud. The image data collected by the vehicle may be forwarded to the cloud. The image data may be processed in the cloud to determine the sign type and supplemental information. This approach is less privacy aware and may overwhelm the communication channel but requires the vehicle to have less processing power.

At block 307, the system 101 may be further configured to detect the road work zone based on the first location, the road object type, and the supplemental information. The system 101 may be further configured to determine a start location of the detected work zone as explained in detail in FIG. 4A-4B.

FIGS. 4A-4B illustrate schematic diagrams showing determining a start location of the detected road work zone at block 307, in accordance with example embodiments.

The schematic diagram 400A of FIG. 4A depicts an example embodiment of determining a start location of the detected work zone. As shown in FIG. 4, a vehicle 401 detects a road object 403 based on sensor data and map data. The first location of a road object 403 may be determined based on location of the vehicle 401 at a time of road object sighting and the sensor data. As discussed in FIG. 1, the user equipment 105 may be the dedicated vehicle 401 (or a part thereof) for gathering data for development of the map data in the database 103*a*. The sensors may include acoustic sensors such as a microphone array, position sensors such as a GPS sensor, a gyroscope, a LIDAR sensor, a proximity sensor, motion sensors such as accelerometer, an image sensor such as a camera and the like. The road object 403 includes various types of objects that are encountered on a route of travel of the user equipment. For example, when the user equipment 107 is a vehicle, the road object may be a road sign, such as a construction related sign or a road work zone sign, a road narrow sign, a speed limit sign, a road works detection sign, a traffic cone, a guide rail, and the like.

In accordance with an example embodiment, road observations of the road object are extracted from the sensor data. To extract the "road object", the system may use the following sensor data message:

road_observation.details( ).oem_details( ).sign_type( )=e_ca_road_con_xmiles:RECTANGULAR||e_ca_road_con_xmiles:DIAMOND Further the road observations of the road object 403 are processed by the processor 201. During processing, the first location of the road object 403 is determined by fusing the vehicle's location at the time of sign sighting with the positional offsets (latitude, longitude, vertical) that may also be received as the road observation of the road object 403 by the sensor associated with the vehicle 401. In accordance with an example embodiment, the first location is the road object's actual location. After the first location of the road object is determined, the road object may be then associated with a road or link via a point-based map matching. In some embodiments, a path-based map-matcher is alternatively used to identify the link associated with the road object 403. If the road object 403 is successfully map matched then the system 101 may determine a road object type 403*a* and supplemental information 403*b* associated with the road object 403, based on image data captured by the vehicle 401 at the time of road object 403 sighting. In accordance with an embodiment, the road object type 403*a* may be a start of construction sign. In accordance with an embodiment, the supplemental information 403*b* comprises distance information and unit information of the distance associated with the road object type. In accordance with an embodiment, the distance information comprising at least of an integer. The unit information comprises, at least one of kilometers, miles, meters, or yards.

For example, the road object 403 shows a construction ahead road sign type and mentions supplemental information "1 km". When the image of this road object 403 is captured by a sensor of the vehicle 401, such as by a camera, the road object type 403*a* is determined as "Road works X km ahead" sign, and supplemental information 403*b* define this X value as 1 km. Here "1" is the distance information and "km" is the unit information. This image data of the road object 403 is subjected to computer vision analysis to identify the road object type 403*a* and the supplemental information 403*b*.

The system 101 may further detect the road work zone in which this road object 403 is placed, based on the first location, the road object type 403*a*, and the supplemental information 403*b*.

Further, the system 101 may be configured to project the supplemental information 403*b* from the first location along a route (for example, on-route map distance) of the vehicle 401, until a distance measure associated with the distance information (1 Km as shown in FIG. 4A) is reached. The system may further identify a second location based on a projection operation. The system may further determine the second location as a start location of the detected work zone 405.

To that end, the distance and the units that are reported by the computer vision algorithm in the supplemental information 403*b* are projected from the sign's map matched location along the route (i.e. not Euclidian distance but on-route distance) until the distance measure (e.g. 1 km) is reached. This point gives the second location 405.

In a similar manner, the schematic diagram 400B of FIG. 4B depicts an example embodiment of determining the start location of the detected work zone. The system 101 may be configured to cluster, a plurality of locations associated with a plurality of road observations for the road object 403, wherein each location in the plurality of locations is the corresponding second location for that road observation. The plurality of observations may be reported by a plurality of vehicles. Thus, the plurality of the locations may be captured by plurality of vehicles. In according to another example embodiment, Density-Based Spatial Clustering of Applications with Noise (DBSCAN) clustering may be performed on the plurality of locations road object. The DBSCAN algorithm is based on an intuitive notion of "clusters" and "noise". Clusters are dense regions in the data space, separated by regions of the lower density of points. DBSCAN is a density-based clustering algorithm: given a set of points in some space, it groups together points that are closely packed together (points with many nearby neighbors), marking as outliers points that lie alone in low-density regions (whose nearest neighbors are too far away).

In accordance with an example embodiment, the plurality of locations may be on the same route, same direction and within a distance threshold, for example, 20 m to account for GPS uncertainty.

The system 101 may be further configured to determine a centroid location 407 for the cluster of the plurality of locations. In accordance with an example embodiment, the centroid may be a mean location of the plurality of locations in a same cluster.

Further, the system 101 may be configured to determine start location of the detected work zone 409 based on the determined centroid.

FIG. 5 illustrates a flow diagram of a method 500 for detecting a road work zone, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 is detecting a road work zone. Fewer, more, or different steps may be provided.

At step 501, the method 500 comprises detecting a road object based on sensor data and map data. In accordance with an embodiment, the sensor data may refer to the data captured by the vehicle sensors. In accordance with an embodiment, the sensor data may refer to the data captured by the vehicle using sensors. As discussed in FIG. 1, the user equipment 105 may be a dedicated vehicle (or a part thereof) for gathering data for development of the map data in the database 103*a*. The sensors may include acoustic sensors such as a microphone array, position sensors such as a GPS sensor, a gyroscope, a LIDAR sensor, a proximity sensor, motion sensors such as accelerometer, an image sensor such as a camera and the like. The road object includes various types of objects that are encountered on a route of travel of the user equipment. For example, when the user equipment 107 is a vehicle, the road object may be a road sign, such as a construction related sign or a road work zone sign, a road narrow sign, a speed limit sign, a road works detection sign, a traffic cone, a guide rail, and the like.

At step 503, the method 500 comprises determining a first location associated with the road object based on location of a vehicle capturing the road object at a time of road object sighting and the sensor data. In accordance with an example embodiment, the first location is the road object's actual location that may be determined by fusing the vehicle's location at the time of road object sighting with the position offsets (latitude, longitude, vertical). After the road object's first location determination, the road object is then associated with a road or link via a point-based map matching (or a path-based map matching). If the road object is successfully map matched then the system 101 may proceed to the step 505.

At step 505, the method 500 comprises, based on image data captured by the vehicle at the time of road object sighting, determining a road object type and supplemental information associated with the road object. In accordance with an embodiment, the road object type may be a start of construction indication sign. In accordance with an embodiment, the supplemental information comprises distance information and unit information associated with the road object type. In accordance with an embodiment, the distance information comprising at least of an integer. The unit information comprises, at least one of kilometers, miles, meters, or yards.

At step 507, the method 500 comprises detecting the road work zone based on the first location, the road object type, and the supplemental information. The method 500 may further comprise determining a start location of the detected work zone as explained in detail in FIG. 6-FIG. 7 below:

In this manner, the method 500 may be configured to enable navigation of vehicles in a real-time and a reliable manner. The method 500 may be implemented using corresponding circuitry. For example, the method 500 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g., the processor 201) configured to perform some or each of the operations of the method 500. The processor may, for example, be configured to perform the operations (501-507) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-507) may comprise, for example, the processor 201 which may be implemented in the system 101 and/or a device or circuit for executing instructions or executing an algorithm for processing information as described above.

FIG. 6 illustrates a flow diagram of a method 600 for determining start location of the detected road work zone, in accordance with an example embodiment. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is determining a start location of the detected road work zone. Fewer, more, or different steps may be provided.

At step 601, the method 600 comprises projecting the supplemental information from the first location along a route of the vehicle, until a distance measure associated with the distance information from the first location is reached. To that end, the projection may comprise drawing or marking a line segment from the first location of the road object, in the direction of the route of travel of the vehicle, until a distance as defined by the distance measure captured in the supplemental information of the road object. For example, for the example illustrated in FIG. 4A, from the actual location of the road object 403, a line segment is drawn in the direction from left to right (which is the direction of the travel of the vehicle 401), and the length of the line segment is 1 km on the route which marks the expected start of the road work zone 405.

At step 603, the method 600 comprises identifying a second location based on the projection. For example, in the example of FIG. 4A described above, the location 405 is identified till 1 km distance measure is reached on the route of the vehicle 401, from the actual location of the road object 403 in the direction from left to right.

At step 605, the method 600 comprises determining the second location as a start location of the detected road work zone. Thus, this location 405 is them determined as the start location of the road work zone that follows. This is further explained in FIG. 7.

FIG. 7 illustrates a flow diagram of a method 700 for determining start location of the detected road work zone, in accordance with an example embodiment. It will be understood that each block of the flow diagram of the method 700 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 700 illustrated by the flowchart diagram of FIG. 7 is determining a start location of a detected road work zone. Fewer, more, or different steps may be provided.

At step 701, the method 700 comprises clustering a plurality of locations associated with a plurality of road observations for the road object, wherein each location in the plurality of locations is the corresponding second location for that road observation. In accordance with an example embodiment, the plurality of the locations may be captured by plurality of vehicle. Further, according to another example embodiment, Density-Based Spatial Clustering of Applications with Noise (DBSCAN) clustering may be performed on the plurality of locations of road object. The DBSCAN algorithm is based on an intuitive notion of "clusters" and "noise". Clusters are dense regions in the data space, separated by regions of the lower density of points. DBSCAN is a density-based clustering algorithm: given a set of points in some space, it groups together points that are closely packed together (points with many nearby neighbors), marking as outliers points that lie alone in low-density regions (whose nearest neighbors are too far away).

In accordance with an example embodiment, the plurality of locations may be on the same route, same direction and within a distance threshold, for example, 20 m to account for GPS uncertainty.

At step 703, the method 700 comprises determining a centroid location for the cluster of the plurality of locations. In accordance with an example embodiment, the centroid may be a mean location of the plurality of locations in a same cluster.

At step 705, the method 700 comprises, determining the start location of the detected work zone based on the determined centroid. The example shown in FIG. 7 uses centroid as the mathematical and statistical measure for centroid determination, but any other suitable mathematical and statistical measure may be equivalently used, without deviating from the scope of the present disclosure.

In this manner, the method 700 may be configured to enable navigation of vehicles in a real-time and a reliable manner. The method 700 may be implemented using corresponding circuitry. For example, the method 700 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 700.

In an example embodiment, an apparatus for performing the method 700 of FIG. 7 above may comprise a processor (e.g., the processor 201) configured to perform some or each of the operations of the method 700. The processor may, for example, be configured to perform the operations (701-705) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (701-505) may comprise, for example, the processor 201 which may be implemented in the system 101 and/or a device or circuit for executing instructions or executing an algorithm for processing information as described above.

In this manner, the method 700 may be configured to enable navigation of vehicles in a real-time and a reliable manner. The method 700 may be implemented using corresponding circuitry. For example, the method 700 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 700.

In an example embodiment, an apparatus for performing the method 700 of FIG. 7 above may comprise a processor (e.g., the processor 201) configured to perform some or each of the operations of the method 700. The processor may, for example, be configured to perform the operations (701-705) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (701-705) may comprise, for example, the processor 201 which may be implemented in the system 101 and/or a device or circuit for executing instructions or executing an algorithm for processing information as described above.

In this manner, the present disclosure provides efficient and user-friendly techniques for updating navigation instructions. Along with this, in some embodiments, most of the processing is done by a remote server based or cloud-based server, so the end user may be able to leverage fast processing and improved storage benefits provided by the present disclosure. Thus, the navigation instructions may be generated based on up-to-date and real time data, providing accurate and reliable navigation services to the end users.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for detecting a road work zone, comprising:

detecting a road object based on sensor data and map data;

determining a first location associated with the road object based on a location of a vehicle capturing the road object at a time of the road object sighting and the sensor data, wherein the road object is a road work sign indicating a distance to a start of the road work zone;

based on determining that a map matching of the first location to a road or a link is successful, using a computer vision system to process image data to detect a road object type and supplemental information associated with the road object, wherein the image data was captured by the vehicle at the time of the road object sighting, and wherein the supplemental information comprises the distance to the start of the road work zone indicated on the road work sign;

detecting the road work zone based on the first location, the road object type, and the supplemental information; and initiating a transitioning of an autonomous vehicle from an autonomous driving mode to a manual driving mode based on the detected work zone.

2. The method of claim 1, wherein the supplemental information further comprises unit information associated with the road object type, wherein the unit information indicates a unit of distance measurement associated with the distance to the start of the road work zone, and wherein the computer vision system is further used to process the image data to detect the unit information.

3. The method of claim 2, wherein detecting the road work zone further comprises:

projecting the supplemental information from the first location along a route of the vehicle, until a distance measure associated with the distance information is reached;

identifying a second location based on the projection; and determining the second location as a start location of the detected road work zone.

4. The method of claim 3, further comprising:

clustering a plurality of locations associated with a plurality of road observations for the road object, wherein each location in the plurality of locations is the corresponding second location for that road observation;

determining a centroid location for the cluster of the plurality of locations; and determining start location of the detected work zone based on the determined centroid.

5. The method of claim 4, wherein the plurality of locations is on the same route, same direction and within a distance threshold.

6. The method of claim 4, wherein the centroid is a mean location of the plurality of locations in a same cluster.

7. The method of claim 4, wherein the clustering is done using a DB-SCAN algorithm.

8. The method of claim 1, wherein the road object type is a start of construction indication sign.

9. A system for detecting a road work zone, the system comprising:

at least one non-transitory memory configured to store computer executable instructions; and at least one processor configured to execute the computer executable instructions to:

detect a road object based on sensor data and map data;

determine a first location associated with the road object based on location of a vehicle capturing the road object at a time of road object sighting and the sensor data, wherein the road object is a road work sign indicating a distance to a start of the road work zone;

based on determining that a map matching of the first location to a road or a link is successful, use a computer vision system to process image data to detect a road object type and supplemental information associated with the road object, wherein the image data was captured by the vehicle at the time of the road object sighting, and wherein the supplemental information comprises the distance to the start of the road work zone indicated on the road work sign;

detect the road work zone based on the first location, the road object type, and the supplemental information; and initiate a transitioning of an autonomous vehicle from an autonomous driving mode to a manual driving mode based on the detected work zone.

10. The system of claim 9, wherein the supplemental information further comprises unit information associated with the road object type, wherein the unit information indicates a unit of distance measurement associated with the distance to the start of the road work zone, and wherein the computer vision system is further used to process the image data to detect the unit information.

11. The system of claim 10, wherein the at least one processor is configured to execute the computer executable instructions to:

project the supplemental information from the first location along a route of the vehicle, until a distance measure associated with the distance information is reached;

identify a second location based on the projection; and determine the second location as a start location of the detected road work zone.

12. The system of claim 11, wherein the at least one processor is configured to execute the computer executable instructions to:

cluster a plurality of locations associated with a plurality of road observations for the road object, wherein each location in the plurality of locations is the corresponding second location for that road observation;

determine a centroid location for the cluster of the plurality of locations; and determine a start location of the detected road work zone based on the determined centroid.

13. The system of claim 12, wherein the plurality of locations is on a same route, a same direction and within a distance threshold.

14. The system of claim 12, wherein the centroid is a mean location of the plurality of locations in a same cluster.

15. The system of claim 12, wherein the clustering is done using a DB-SCAN algorithm.

16. The system of claim 9, wherein the road object type is a start of construction indication sign.

17. A computer programmable product comprising a non-transitory computer readable medium having stored thereon computer executable instruction which when executed by one or more processors, cause the one or more processors to carry out operations for detecting a road work zone, the operations comprising:

detecting a road object based on sensor data and map data;

determining a first location associated with the road object based on location of a vehicle capturing the road object at a time of road object sighting and the sensor data, wherein the road object is a road work sign indicating a distance to a start of the road work zone;

based on determining that a map matching of the first location to a road or a link is successful, using a computer vision system to process image data to detect a road object type and supplemental information associated with the road object, wherein the image data was captured by the vehicle at the time of the road object sighting, and wherein the supplemental information comprises the distance to the start of the road work zone indicated on the road work sign;

detecting the road work zone based on the first location, the road object type, and the supplemental information; and initiating a transitioning of an autonomous vehicle from an autonomous driving mode to a manual driving mode based on the detected work zone.

18. The computer programmable product of claim 17, wherein the supplemental information further comprises unit information associated with the road object type, wherein the unit information indicates a unit of distance measurement associated with the distance to the start of the road work zone, and wherein the computer vision system is further used to process the image data to detect the unit information.

19. The computer programmable product of claim 17, wherein detecting the road work zone further comprises:

projecting the supplemental information from the first location along a route of the vehicle, until a distance measure associated with the distance information is reached;

identifying a second location based on the projection; and determining the second location as a start location of the detected road work zone.

20. The computer programmable product of claim 17, wherein the operations further comprise:

clustering a plurality of locations associated with a plurality of road observations for the road object, wherein each location in the plurality of locations is the corresponding second location for that road observation;

determining a centroid location for the cluster of the plurality of locations; and determining start location of the detected work zone based on the determined centroid.

* * * * *